United States Patent

Herberger

[15] 3,687,036

[45] Aug. 29, 1972

[54] FILM CARTRIDGE
[72] Inventor: Robert J. Herberger, Rochester, N.Y. 14650
[73] Assignee: Eastman Kodak Company, Rochester, N.Y.
[22] Filed: Sept. 28, 1970
[21] Appl. No.: 76,082

[52] U.S. Cl. .................95/31 R, 95/31 CA, 242/71.2
[51] Int. Cl. .........................................G03b 19/04
[58] Field of Search .........95/31 R, 31 CA; 242/71.2

[56] References Cited

UNITED STATES PATENTS

| 3,253,797 | 5/1966 | Peterson | 95/31 X |
| 3,508,719 | 4/1970 | Browning | 242/71.8 |
| 3,523,496 | 8/1970 | Nerwin | 95/31 |

FOREIGN PATENTS OR APPLICATIONS 1,086,493  10/1967  Great Britain.................95/31

Primary Examiner—Samuel S. Matthews
Assistant Examiner—Michael L. Gellner
Attorney—Robert W. Hampton and D. Peter Hochberg

[57] ABSTRACT

A film cartridge including a compartment having oppositely disposed end walls, one end wall having a protrusion extending therefrom and the other end wall have a recess configured to accommodate the protrusion of an adjacent cartridge to facilitate the compact stacking of the cartridges.

5 Claims, 4 Drawing Figures

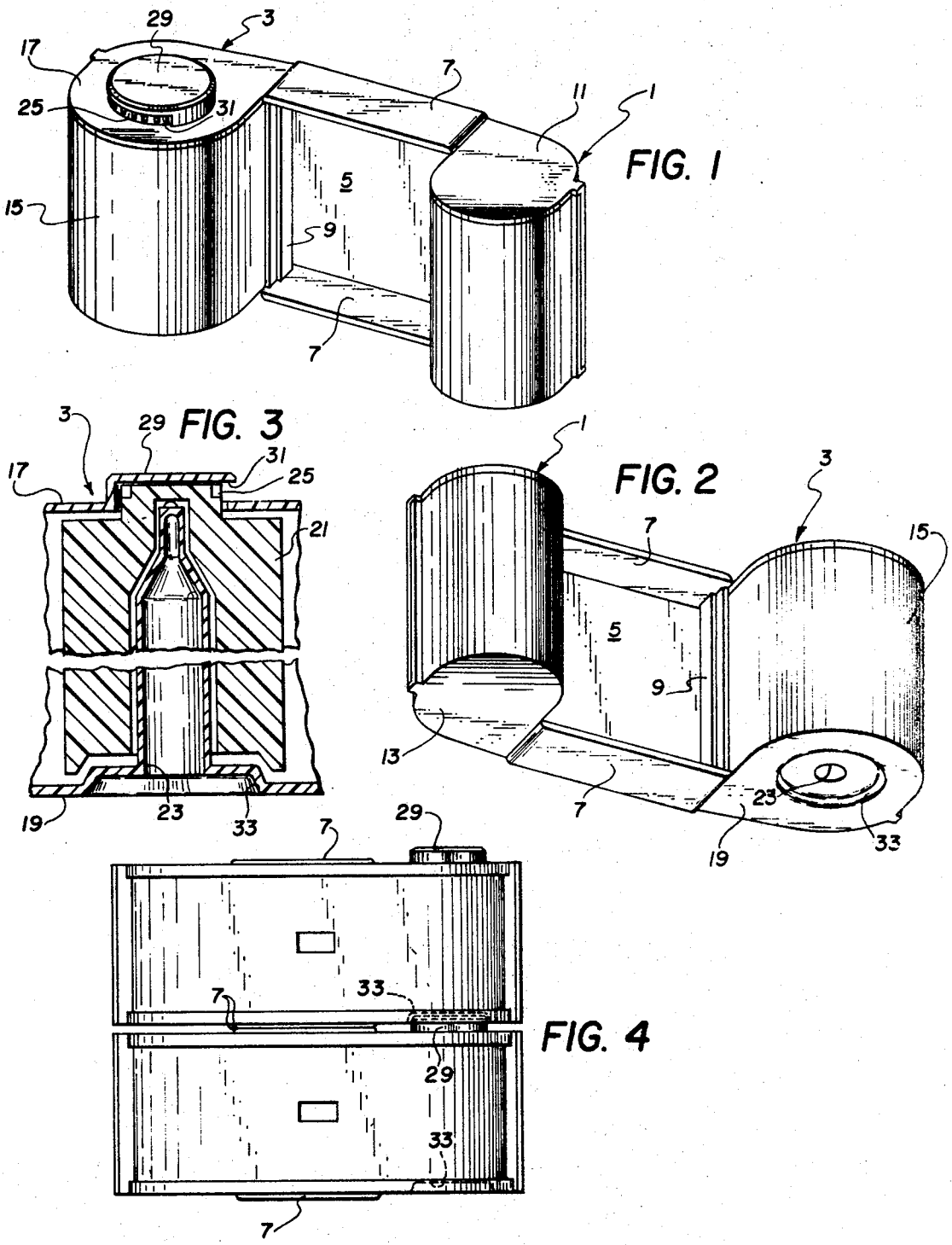

FILM CARTRIDGE

CROSS-REFERENCE TO RELATED APPLICATION

Reference is made to commonly assigned copending U.S. Application Ser. No. 026,015 now Pat. No. 3,613,541 entitled "Gear Drive for A Camera and Film Cartridge," filed Apr. 6, 1970 in the names of Richard J. Bresson and James E. Dierks.

BACKGROUND OF THE INVENTION

1. Field of the Prior

The present invention relates to film cartridges, and more specifically to film cartridges particularly adapted for compact storage and easy handling.

2. Description of the Prior Art

Film cartridges of the type taught by U.S. Pat. No. 3,138,081, which issued June 23, 1964 in the name of Hubert Nerwin, basically comprise a pair of generally cylindrical film compartments disposed at opposite sides of a film support wall member. The upper and lower ends of such cartridges are generally flat, although recesses are provided in the exposed opposite ends of a film winding core journalled in the take-up compartment. Such recesses are adapted to be engaged by inwardly extending radial arms of a camera drive member for rotating the core and transporting film in the cartridge. The absence of projections on the ends of these cartridges makes end-to-end stacking of the cartridges an uncomplicated matter, in that adjacent end sections can be abutted flush against one another. The handling of the cartridges during their manufacture, shipping and storage is thus facilitated.

Previously cited U.S. Pat. Application Ser. No. 026,015 discloses a film cartridge having a take-up compartment with a protruding cover at one end, for protecting a drive gear on the end of a film winding core in the compartment. The provision of the cover gives the cartridge a greater top to bottom dimension at the take-up compartment than elsewhere on the cartridge. Therefore, when the cartridges are stacked in an end-to-end relation, as when they are fed by columns through successive manufacturing operations, they tend to assume a fan shaped arrangement, causing the stack to be unwieldy and bulky. In addition, both the former and latter cartridges can easily slip relative to adjacent cartridges since they are not interlocked in any manner, and they must be relatively tightly confined when handled to bulk.

SUMMARY OF THE INVENTION

An object of the present invention is to facilitate the handling of film cartridges.

A more specific object is to facilitate the handling and storage of film cartridges having a protrusion extending from an end thereof.

Another object is to facilitate the handling and storage of film cartridges having a gear driven take-up core, the cartridges each being of the type which are provided with a cover extending outwardly from the end portion of the cartridge over a gear affixed to an end of the core.

A further object is to achieve the foregoing objects in a simple and economical manner.

Other objects will be apparent from the description to follow and from the appended claims.

The foregoing objects are achieved according to a preferred embodiment of the invention, by means of a film cartridge including a film compartment that houses a winding core having a gear affixed to one end of the core. The compartment includes oppositely disposed end walls, one of which has a protruding cover for protecting the gear, and the other of which has a recess configured to receive the protruding gear cover of an adjacent cartridge. The provision of the recess permits the nesting of the cartridges, thereby facilitating their handling and storage.

BRIEF DESCRIPTION OF THE DRAWINGS

In the detailed description of the preferred embodiment of the invention presented below, reference is made to the accompanying drawing, wherein:

FIGS. 1 and 2 are front isometric views of a film cartridge according to the invention showing the upper and lower end portions thereof, respectively;

FIG. 3 is a partial cross-sectional view of the take-up compartment of the cartridge shown in FIGS. 1 and 2; and FIG. 4 is a rear view of a pair of cartridges according to the invention in a stacked relationship.

DETAILED DESCRIPTION OF A PREFERRED EMBODIMENT OF THE INVENTION

The drawings disclose a film cartridge, according to a preferred embodiment of the invention, which is particularly adapted to be stacked compactly with like cartridges in an end-to-end and preferably also interlocked relationship. The cartridge includes generally cylindrical parallel film supply and take-up compartments disposed on opposite sides of and extending forwardly from an intermediate wall. The upper and lower end portions of the cartridge are defined by substantially flat, parallel exterior surfaces having only minor surface interruptions. However, as explained hereinafter, a cover extends outwardly from one end portion of the cartridge, and a recess for accommodating the cover of an adjacent cartridge is provided in the opposite end portion, to permit the compact stacking of cartridges without interference from the cover. Such an arrangement permits stacking of the cartridges in straight rows without having to provide additional space in the stack to accommodate any increased cartridge dimension resulting from the raised protuberances. Additionally, the cartridges fit together in a mating or registered relationship that prevents relative slipping between stacked cartridges and facilitates their handling during manufacture, storage and shipping.

Referring to FIGS. 1 and 2, the film cartridge comprises a supply compartment 1 and a take-up compartment 3 disposed on opposite sides of a film support wall 5. A set of opposed pairs of forwardly extending walls 7 and 9, respectively, cooperate to define an aperture through which film on support wall 5 may be photographically exposed, and these walls additionally aid in accurately locating the cartridge in a camera.

Supply compartment 1 has a generally cylindrical configuration, and includes a pair of generally flat end walls 11 and 13 which are separated by a distance slightly less than the separation of walls 7. Film is initially wound in convolute form in supply compartment 1, and is incrementally transported across wall 5, whereon it is photographically exposed, and drawn into take-up compartment 3.

Take-up compartment 3 has a side wall 15 which defines a generally cylindrical chamber, and includes an upper end wall 17 and a lower end wall 19. The exterior surfaces of the latter end walls are coplanar with the corresponding surfaces of supply compartment 1. A winding core 21 is rotatably mounted within wall 15 on a spindle 23, as indicated in FIG. 3. A gear 25 is affixed to an end of core 21, and rotation is imparted to the latter in response to the driving engagement of gear 25 with a corresponding gear (not shown) in a camera. Thus, film is normally drawn into compartment 3 and wound around core 21 in response to the rotation of gear 25. The core gear is mounted to extend beyond surface 17 to render the gear engageable by a camera gear, and has a relatively small diameter to reduce the bulk of the cartridge.

In order to protect gear 25 against damage and tampering, a cover 29 extends over and partially encloses the gear, leaving an access opening 31 for a mating camera gear. Thus, gear 25 and cover 29 protrude beyond the otherwise generally flat upper surface of the cartridge. The top to bottom distance of the cartridge taken between the exterior surfaces of cover 29 and end wall 19 is substantially in excess of a similar measurement taken elsewhere on the cartridge.

In order to facilitate the handling and storage of the cartridge, a recess 33 is provided in end wall 19, and is configured to accommodate the gear cover of an adjacent cartridge. Referring to FIG. 4, recess 33 of the upper cartridge receives cover 29 of the lower cartridge, whereby the two cartridges are compactly nested to stacked together. The interlocking of the cartridges additionally inhibits the relative slipping thereof. In the absence of this provision, a stack of cartridges would tend to fan out by virtue of the lower top to bottom dimension of the supply compartment as compared to the like dimension of the take-up compartment, a highly utilitarian feature when one considers the vast volume of cartridges handled during the manufacture, shipping, storage and processing functions associated therewith.

For ease and economy of manufacture, the recess defining walls of the cartridge are preferably integral with end wall 19. In addition, spindle 23 is advantageously integral with the preceding elements as shown in FIG. 3, whereby the compartment 3 is necessarily light impervious at its lower end, there being no junctures in the respective walls.

The invention has been described in detail with particular reference to a preferred embodiment thereof, but it will be understood that variations and modifications can be effected within the spirit and scope of the invention.

I claim:

1. A film cartridge adapted to nest with adjacent similar film cartridges, said film cartridge comprising:
    means for defining a generally cylindrical film compartment comprising a side wall and opposed end walls connected to said side wall;
    a film winding core rotatably mounted within said compartment;
    means, including a gear member connected to said core, for rotating said core;
    means carried by one of said end walls for accommodating said gear member, said means including a gear cover extending outwardly from said one end wall; and
    means carried by the other of said end walls for defining a recess configured to receive the gear cover of an adjacent similar cartridge to facilitate nesting of the cartridges.

2. A film cartridge adapted to be compactly stacked with other film cartridges, said film cartridge comprising:
    a rotatable core for winding filmstrip therearound, said core having oppositely disposed end portions;
    a gear supported by the core at one of said end portions for imparting rotation to said core to wind filmstrip on said core;
    means defining a compartment for housing said core and dimensioned to house filmstrip wound on said core, said compartment having opposed end walls, one of said end walls being located adjacent said one end portion;
    a cover partially enclosing said gear and extending outwardly beyond said one end wall;
    a recess in the other of said end walls, said recess being configured to receive the cover of an adjacent cartridge to facilitate the compact stacking of the cartridges.

3. A film cartridge comprising:
    a take-up compartment including means defining a take-up chamber and oppositely disposed end walls, and having a longitudinal axis and a predetermined diameter;
    a rotatably mounted core in said take-up chamber, said core having a driven end and being generally coaxial with said axis;
    a circular gear for rotating said core, said gear being fixed on the driven end of said core and substantially concentrically disposed in said take-up chamber, said gear having a diameter less than the diameter of said take-up compartment;
    a cover on one of said end walls for said gear, said cover having a width less than the diameter of said take-up compartment; and
    means defining a recess in the other of said end walls, said recess being configured to receive the cover of an adjacent film cartridge.

4. A film cartridge according to claim 3, said cartridge further including a spindle extending inwardly into the take-up chamber from the end wall in which said recess is defined;
    said core being mounted for rotation on said spindle; and
    said spindle being integral with said recess defining means to form a light impervious structure.

5. A film cartridge operable to nest with adjacent similar film cartridges to facilitate the compact stacking thereof, said cartridge comprising:
    means for defining a film compartment including a side wall and opposed end walls connected to said side wall one of said end walls having an opening extending therethrough;
    a film winding core rotatably mounted within said compartment;
    means, including a member connected to said core and protruding through said opening and outwardly beyond said one side wall, for rotating said core; and means, including an inwardly-extending recess carried by the other of said end walls, for receiving therein the protruding core-rotating member of a similar cartridge to facilitate the compact stacking of said cartridges.

* * * * *